United States Patent
Chen

(10) Patent No.: US 9,213,417 B2
(45) Date of Patent: Dec. 15, 2015

(54) KEYBOARD DEVICE WITH LUMINOUS KEY

(71) Applicant: Primax Electronics Ltd., Neihu, Taipei (TW)

(72) Inventor: Chung-Yuan Chen, Taipei (TW)

(73) Assignee: PRIMAX ELECTRONICS LTD., Neihu (TW)

( * ) Notice: Subject to any disclaimer, the term of this patent is extended or adjusted under 35 U.S.C. 154(b) by 267 days.

(21) Appl. No.: 13/920,949

(22) Filed: Jun. 18, 2013

(65) Prior Publication Data

US 2014/0168936 A1    Jun. 19, 2014

(30) Foreign Application Priority Data

Dec. 19, 2012 (TW) .............................. 101148396 A

(51) Int. Cl.
| | |
|---|---|
| H01H 9/00 | (2006.01) |
| G06F 3/02 | (2006.01) |
| H01H 13/83 | (2006.01) |
| H01H 13/02 | (2006.01) |

(52) U.S. Cl.
CPC ........... *G06F 3/0202* (2013.01); *H01H 13/023* (2013.01); *H01H 13/83* (2013.01)

(58) Field of Classification Search
CPC .................................................. H01H 13/023
USPC .................................................. 200/310–317
See application file for complete search history.

(56) References Cited

U.S. PATENT DOCUMENTS

| | | | | |
|---|---|---|---|---|
| 5,081,329 | A * | 1/1992 | Mitusinski et al. ........... | 200/314 |
| 5,510,782 | A * | 4/1996 | Norris et al. .................... | 341/22 |
| 5,512,718 | A * | 4/1996 | Larose .......................... | 200/314 |
| 6,429,853 | B1 * | 8/2002 | Chou ............................ | 345/168 |
| 7,235,752 | B1 * | 6/2007 | Chen et al. .................... | 200/310 |
| 7,388,167 | B2 * | 6/2008 | Liao et al. ..................... | 200/310 |
| 7,952,043 | B2 * | 5/2011 | Lin ............................... | 200/310 |
| 8,253,048 | B2 * | 8/2012 | Ozias et al. .................. | 200/314 |
| 8,461,467 | B2 * | 6/2013 | Hwa ............................. | 200/5 A |
| 8,917,243 | B2 * | 12/2014 | Sellers ......................... | 345/170 |
| 2010/0108481 | A1 * | 5/2010 | Chiang ........................ | 200/310 |
| 2011/0168532 | A1 * | 7/2011 | Tsai et al. .................... | 200/314 |
| 2011/0247925 | A1 * | 10/2011 | Lin .............................. | 200/5 A |
| 2011/0278147 | A1 * | 11/2011 | Lee et al. ..................... | 200/5 A |

* cited by examiner

*Primary Examiner* — Renee S Luebke
*Assistant Examiner* — Doblade Elliott
(74) *Attorney, Agent, or Firm* — Kirton McConkie; Evan R. Witt

(57) ABSTRACT

A keyboard device with a luminous key is provided. The keyboard device includes at least one luminous key, a top-view light-emitting element, and a light shade. The top-view light-emitting element is used for emitting a light beam. The light shade is used for shading the light beam. Moreover, the light beam is transmissible through a light-outputting part of the light shade to illuminate the luminous key. The at least one luminous key includes at least one keycap and at least one elastic element. The elastic element and the light shade are integrally formed with each other. Since the total area of the bottom surfaces of the elastic element and the light shade is increased, the light shade can be securely fixed.

14 Claims, 9 Drawing Sheets

006
KEYBOARD DEVICE WITH LUMINOUS KEY

FIELD OF THE INVENTION

The present invention relates to a keyboard device, and more particularly to a keyboard device with a luminous key.

BACKGROUND OF THE INVENTION

Generally, the common input device of a computer system includes for example a mouse device, a keyboard device, a trackball device, or the like. Via the keyboard device, the user may input characters and symbols into the computer system. As a consequence, most users and most manufacturers of input devices pay much attention to the development of keyboard devices.

Hereinafter, the structures and the functions of a conventional keyboard device will be illustrated with reference to FIG. 1. FIG. 1 is a schematic view illustrating the outward appearance of a conventional keyboard device. As shown in FIG. 1, there are plural keys 10 and plural indicating lamps 11 on a surface of the conventional keyboard device 1. These keys 10 include ordinary keys, numeric keys, function keys, and the like. When one of these keys 10 is depressed by the user's finger, a corresponding signal is issued to the computer, and thus the computer executes a function corresponding to the depressed key. For example, when an ordinary key is depressed, a corresponding English letter or symbol is inputted into the computer. When a numeric key is depressed, a corresponding number is inputted into the computer. In addition, the function keys (F1~F12) can be programmed to provide various functions. The locations of the indicating lamps 11 correspond to the Caps lock key, the Number lock key and the Scroll lock key, respectively. In case that one of the Caps lock key, the Number lock key and the Scroll lock key is depressed, a corresponding specific function is enabled, and thus a corresponding indicating lamp 11 is turned on to result in a prompt. According to the illuminated indicating lamp, the user may realize that the corresponding one of the Caps lock key, the Number lock key and the Scroll lock key has been depressed and the corresponding function has been enabled. Since these indicating lamps 11 occupy additional layout space of the keyboard device 1, the indicating lamps become hindrance from reducing the volume of the keyboard device 1. Moreover, too many indicating lamps 11 may confuse the user. Under this circumstance, the user fails to accurately judge which key is correlated to the illuminated indicating lamp.

For solving the above drawbacks, a keyboard device with a luminous key is disclosed. FIG. 2 is a schematic cross-sectional view illustrating a conventional keyboard device with a luminous key. As shown in FIG. 2, the keyboard device 2 comprises a base 20, plural luminous keys 21, plural non-luminous keys 22, plural light-emitting elements 23, a membrane switch circuit member 24, and a plastic film layer 25. Each of the luminous keys 21 comprises a keycap 211 and an elastic element 212. Each of the non-luminous keys 22 comprises a keycap 221 and an elastic element 222. The keycap 211 of each luminous key 21 has a light-transmissible zone 2111. The plural light-emitting elements 23 are disposed on the membrane switch circuit member 24 and disposed under the light-transmissible zone 2111 of corresponding luminous keys 21. The plural light-emitting elements 23 are used for emitting plural light beams (not shown). The light beams may be transmitted through the light-transmissible zones 2111 of the luminous keys 21. The luminous keys 21 are specific function keys, which may be triggered to enable specific functions. For example, the luminous keys 21 includes the Caps lock key, the Number lock key, the Scroll lock key, and the like. Each of the luminous keys 21 further comprises a light shade 213 with an opening 2131. In addition, the corresponding light-emitting element 23 is partially enclosed by the light shade 213. Consequently, the light beams emitted by the light-emitting element 23 are only permitted to be transmitted through the opening 2131 of the light shade 213 without being scattered through the periphery of the light shade 213. As shown in FIG. 2, the light-emitting elements 23 are top-view light emitting diodes. In addition, the light shade 213 is made of a rubbery material.

The membrane switch circuit member 24 comprises an upper wiring board 241, a partition plate 242, and a lower wiring board 243. The upper wiring board 241 has plural upper contacts 2411 corresponding to the plural luminous keys 21 and the plural non-luminous keys 22. The partition plate 242 is disposed under the upper wiring board 241. In addition, the partition plate 242 has plural perforations 2421 corresponding to the plural upper contacts 2411. The lower wiring board 243 is disposed under the partition plate 242. In addition, the lower wiring board 243 has plural lower contacts 2431 corresponding to the plural perforations 2421. Each of the upper contacts 2411, the corresponding perforation 2421 and the corresponding lower contact 2431 are collectively defined as a key intersection 244. The plastic film layer 25 is disposed on the membrane switch circuit member 24. In addition, the plastic film layer 25 is coated with a black ink layer 251, so that the light beams are blocked by the plastic film layer 25. The base 20 is used for supporting the plural luminous keys 21, the plural non-luminous keys 22, the plural light-emitting elements 23, the membrane switch circuit member 24 and the plastic film layer 25.

When the keycap 211 of the key 21 or the keycap 221 of the key 22 is depressed by the user, the keycap 211 or 221 is moved downwardly to compress the elastic element 212 or 222, so that the corresponding upper contact 2411 is pushed by the elastic element 212 or 222. Consequently, the corresponding upper contact 2411 is inserted into the corresponding perforation 2421 to be contacted with the corresponding lower contact 2431. When the upper contact 2411 and the lower contact 2431 are contacted with each other, the corresponding key intersection 244 is electrically conducted, and thus a corresponding luminous key signal or a corresponding non-luminous key signal is generated. On the other hand, when the depressing force exerted on the keycap 211 or 221 is eliminated, an elastic force provided by the elastic element 212 or 222 is acted on the keycap 211 or 221. In response to the elastic force, the keycap 211 or 221 is moved upwardly and returned to an original position where the keycap 211 or 221 is not depressed.

In addition, when the keycap 211 of one of the luminous keys 21 is depressed and a corresponding luminous key signal is generated, the specific function corresponding to the depressed luminous key 21 is enabled. At the same time, the corresponding light-emitting element 23 is driven to emit a light beam in response to the luminous key signal. The light beam will be sequentially transmitted through the opening 2131 of the light shade 213 and the light-transmissible zone 2111 of the keycap 211. Since the light shade 213 has a function of centralizing the light beam, the intensity of the light beam outputted from the light-transmissible zone 2111 of the keycap 211 is increased to facilitate the user to realize whether the specific function corresponding to the depressed luminous key 21 is enabled.

Since the light shades 213 of the luminous keys 21 are attached on the plastic film layer 25 by adhesion, some drawbacks may possibly occur. For example, during the process of attaching the light shade 213 on the plastic film layer 25, if the light shade 213 is suffered from misalignment, the opening 2131 of the light shade 213 fails to be aligned with the light-emitting element 23. Under this circumstance, only a portion of the light beam from the light-emitting element 23 is transmitted through the opening 2131 of the light shade 213. Whereas, the remaindering portion of the light beam from the light-emitting element 23 is blocked by the light shade 213. Consequently, the illuminating efficacy of the luminous key 21 is insufficient for the user to identify whether the luminous key 21 is illuminated. In addition, an assembling error is readily generated during the process of assembling the light shade 213 and the plastic film layer 25. Consequently, after the keyboard 2 is produced, the light shade 213 is easily detached. If the light shade 213 is detached, the light beam emitted by the light-emitting element 23 will be scattered everywhere because the light beam is no longer centralized by the light shade 213. Under this circumstance, the illuminating efficacy of the luminous key 21 is still insufficient.

SUMMARY OF THE INVENTION

The present invention provides a keyboard device with a luminous key, in which the light shade of the keyboard device can be securely fixed.

In accordance with an aspect of the present invention, there is provided a keyboard device. The keyboard device includes at least one luminous key, at least one top-view light-emitting element, and at least one light shade. The at least one luminous key includes at least one keycap and at least one elastic element. Each of the at least one keycap has a first light-outputting zone. The at least one elastic element is disposed under the at least one keycap and contacted with the at least one keycap for providing an elastic force to the at least one keycap. The at least one top-view light-emitting element is disposed under the corresponding first light-outputting zone for emitting at least one first light beam. The at least one first light beam is transmitted through the corresponding first light-outputting zone. The at least one light shade is connected with the at least one elastic element, and disposed over the at least one top-view light-emitting element. Each of the at least one light shade has a light-outputting part. The at least one first light beam is shaded by the at least one light shade, but the at least one first light beam is permitted to be transmitted through the corresponding light-outputting part and directed to the corresponding first light-outputting zone. Moreover, the at least one light shade and the at least one elastic element are integrally formed with each other.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
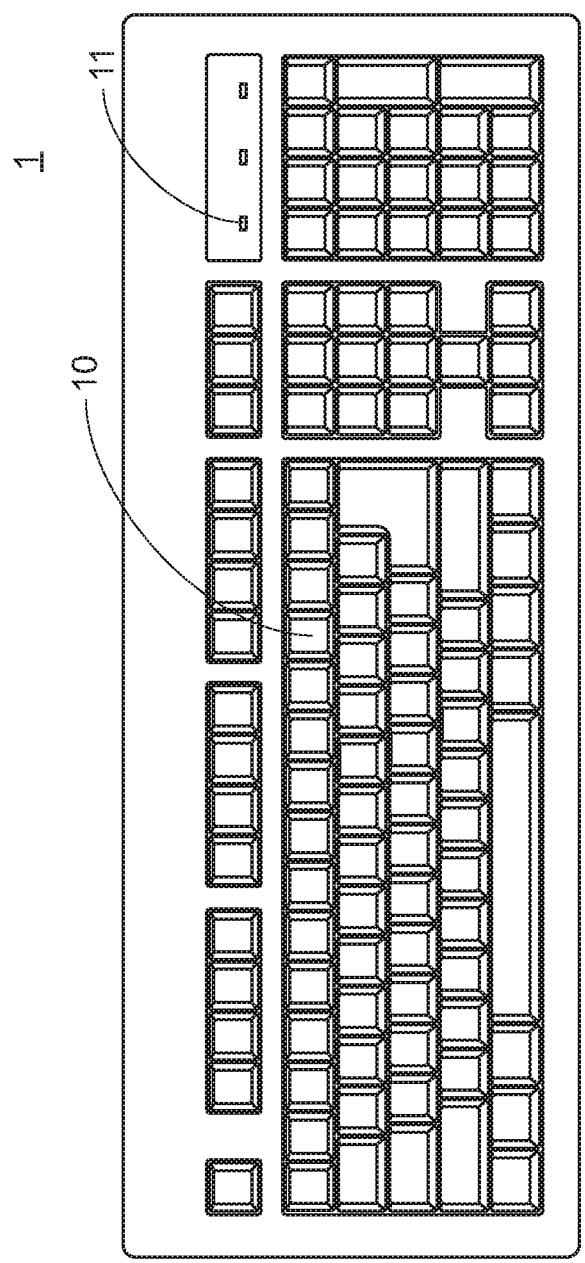
FIG. 1 is a schematic view illustrating the outward appearance of a conventional keyboard device.
Figure 2:
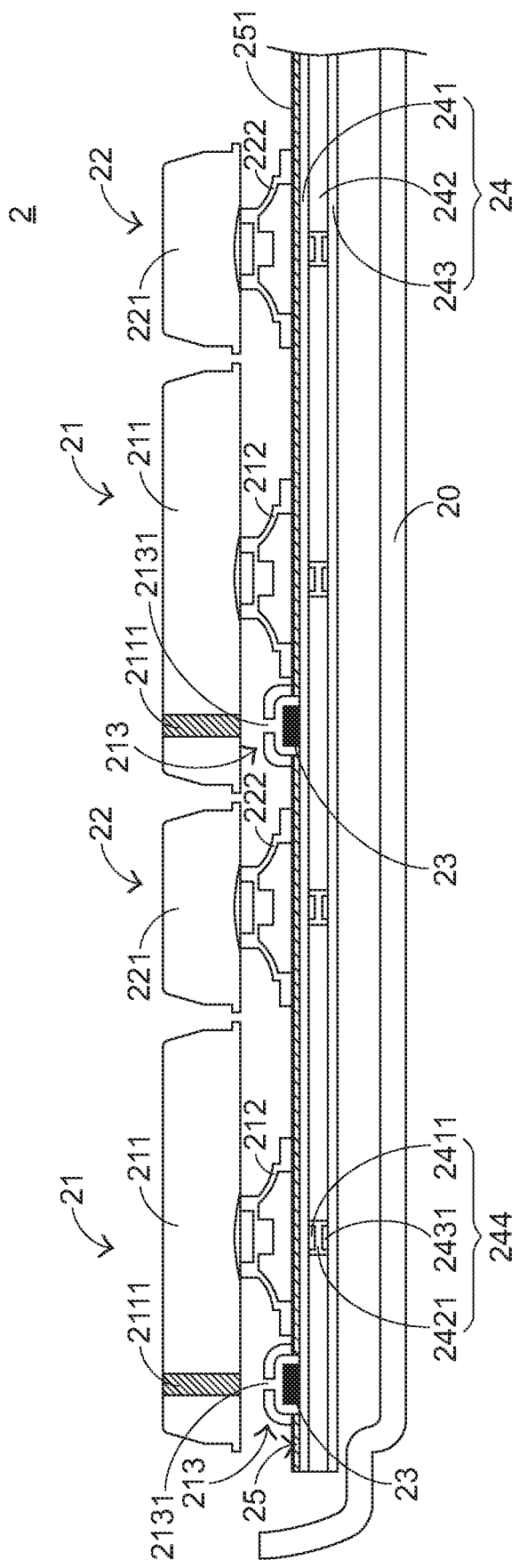
FIG. 2 is a schematic cross-sectional view illustrating a conventional keyboard device with a luminous key.
Figure 3:
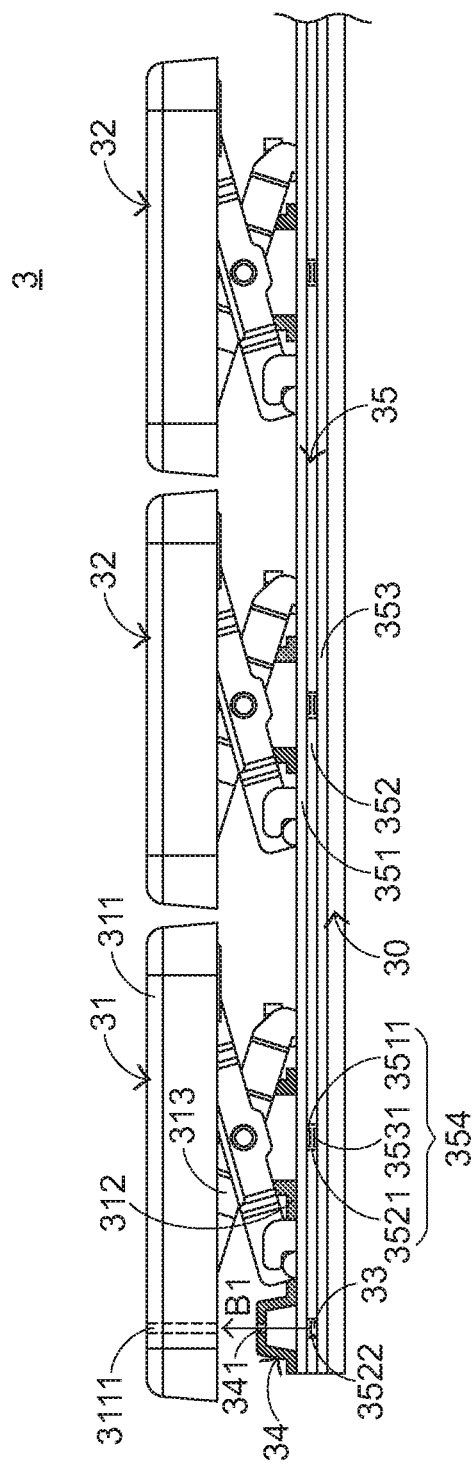
FIG. 3 is a schematic view illustrating a keyboard device with a luminous key according to a first embodiment of the present invention.
Figure 4:
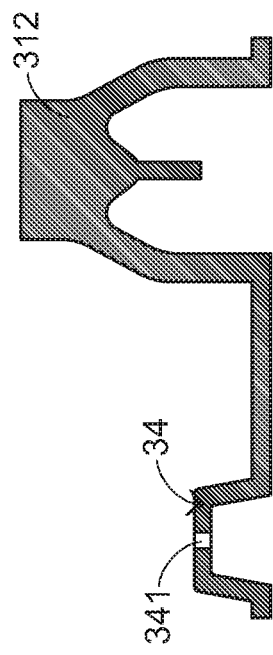
FIG. 4 is a schematic partial cross-sectional view illustrating an elastic element and a light shade of the keyboard device according to the first embodiment of the present invention.

FIG. 3 is a schematic view illustrating a keyboard device with a luminous key according to a first embodiment of the present invention. FIG. 4 is a schematic partial cross-sectional view illustrating an elastic element and a light shade of the keyboard device according to the first embodiment of the present invention. As shown in FIGS. 3 and 4, the keyboard device 3 comprises a supporting plate 30, at least one luminous key 31, plural non-luminous keys 32, a top-view light-emitting element 33, a light shade 34, and a membrane switch circuit member 35. The supporting plate 30 is disposed under the membrane switch circuit member 35 for supporting the at least one luminous key 31, the plural non-luminous keys 32 and the membrane switch circuit member 35.

The at least one luminous key 31 comprises at least one keycap 311, at least one elastic element 312, and at least one connecting element 313. The at least one keycap 311 has a first light-outputting zone 3111. The at least one elastic element 312 is disposed under the at least one keycap 311. Moreover, the at least one elastic element 312 is contacted with the at least one keycap 311 for providing an elastic force to the at least one keycap 311. The at least one connecting element 313 is arranged between the supporting plate 30 and the at least one keycap 311. The at least one connecting element 313 is used for connecting the supporting plate 30 and the at least one keycap 311 and allowing the at least one keycap 311 to be moved upwardly or downwardly relative to the supporting plate 30. In this embodiment, the first light-outputting zone 3111 is an indicating lamp cover, and the connecting element 313 is a scissors-type connecting element.

The top-view light-emitting element 33 is disposed under the first light-outputting zone 3111 for emitting a first light beam B1. The first light beam B1 is transmitted through the first light-outputting zone 3111. In this embodiment, the top-view light-emitting element 33 is a top-view light emitting diode. The light shade 34 is connected with the at least one elastic element 312, and disposed over the top-view light-emitting element 33. The light shade 34 has a light-outputting part 341. The first light beam B1 is shaded by the light shade 34. However, the first light beam B1 can be transmitted through the light-outputting part 341, and directed to the first light-outputting zone 3111. In this embodiment, the light shade 34 and the at least one elastic element 312 are integrally formed with each other. Moreover, the light shade 34 and the at least one elastic element 312 are made of an opaque rubbery material. Moreover, the light-outputting part 341 of the light shade 34 is an opening Except that the elastic element of the non-luminous key 32 is not connected with the light shade 34 and the keycap of the non-luminous key 32 does not have the first light-outputting zone, the other structures of the non-luminous key 32 are substantially identical to those of the luminous key 31, and are not redundantly described herein.

The membrane switch circuit member 35 is disposed under the at least one elastic element 312. Moreover, the membrane switch circuit member 35 has at least one key intersection 354 corresponding to the at least one luminous key 31. In this embodiment, the membrane switch circuit member 35 comprises an upper wiring board 351, a partition plate 352, and a lower wiring board 353. The upper wiring board 351 has at least one upper contact 3511. The partition plate 352 is disposed under the upper wiring board 351. In addition, the partition plate 352 has at least one first perforation 3521 corresponding to the at least one upper contact 3511. When the membrane switch circuit member 35 is depressed, the at least one upper contact 3511 is inserted into the at least one first perforation 3521. The lower wiring board 353 is disposed under the partition plate 352. In addition, the lower wiring board 353 has at least one lower contact 3531 corresponding to the at least one upper contact 3511. The at least one upper contact 3511, the at least one first perforation 3521 and the at least one lower contact 3531 are collectively defined as the at least one key intersection 354. When the at least one keycap 311 is depressed by the user, the at least one connecting element 313 is correspondingly switched to a folded state. Consequently, the at least one keycap 311 is moved downwardly relative to the supporting plate 30, and the at least one elastic element 312 is depressed and compressed by the at least one keycap 311. Under this circumstance, since the at least one key intersection 354 of the membrane switch circuit member 35 is pushed by the at least one elastic element 312, the at least one key intersection 354 is triggered to generate a corresponding luminous key signal. On the other hand, when the depressing force exerted on the at least one keycap 311 is eliminated, an elastic force provided by the at least one elastic element 312 is acted on the at least one keycap 311. In response to the elastic force, the at least one keycap 311 is returned to an original position. The operating principles of depressing the non-luminous key 32 are substantially identical to those of the luminous key 31, and are not redundantly described herein.

Please refer to FIG. 3 again. The partition plate 352 further comprises a second perforation 3522. The second perforation 3522 is disposed under the light shade 34. The top-view light-emitting element 33 is disposed on the lower wiring board 353, and inserted into the second perforation 3522. The upper wiring board 351 is light-transmissible for allowing the first light beam B1 to go through. Consequently, the first light beam B1 from the top-view light-emitting element 33 can be transmitted through the second perforation 3522, the upper wiring board 351 and the light-outputting part 341, and directed to the first light-outputting zone 3111. Under this circumstance, the user can identify whether a specific function corresponding to the luminous key 31 is enabled by naked eyes according to the illuminating status of the first light-outputting zone 3111. In this embodiment, the upper wiring board 351 is made of a light-transmissible material, so that the first light beam B1 can be transmitted through the upper wiring board 351. An example of the light-transmissible material includes but is not limited to polyethylene terephthalate (PET), polycarbonate (PC) or polymethylmethacrylate (PMMA).

In the above embodiment, the top-view light-emitting element 33 is electrically connected with the trace pattern of the lower wiring board 353. For clarification and brevity, the trace pattern of the lower wiring board 353 is not shown in the drawings. Moreover, the second perforation 3522 of the partition plate 352 is used for accommodating the top-view light-emitting element 33. If the top-view light-emitting element has a larger size, the upper wiring board further comprises an additional perforation corresponding to the top-view light-emitting element in order to facilitate accommodating the top-view light-emitting element. Moreover, the elastic element 312 of this embodiment is made of a rubbery material, and each elastic element 312 is aligned with one corresponding keycap 311 in a one-by-one arrangement.

From the above discussions, after the above components are combined together, the keyboard device 3 with the luminous key 31 is produced. When the luminous key 31 is depressed, the key intersection 354 of the membrane switch circuit member 35 is triggered to generate the luminous key signal. At the same time, the top-view light-emitting element 33 is driven to emit the first light beam B1 in response to the luminous key signal. Since the first light beam B1 is transmitted through the light-outputting part 341 of the light shade 34, the first light beam B1 is centralized to be directed to the first light-outputting zone 3111 of the keycap 311. Under this circumstance, the possibility of scattering and leaking the first light beam B1 will be minimized.

Figure 5:
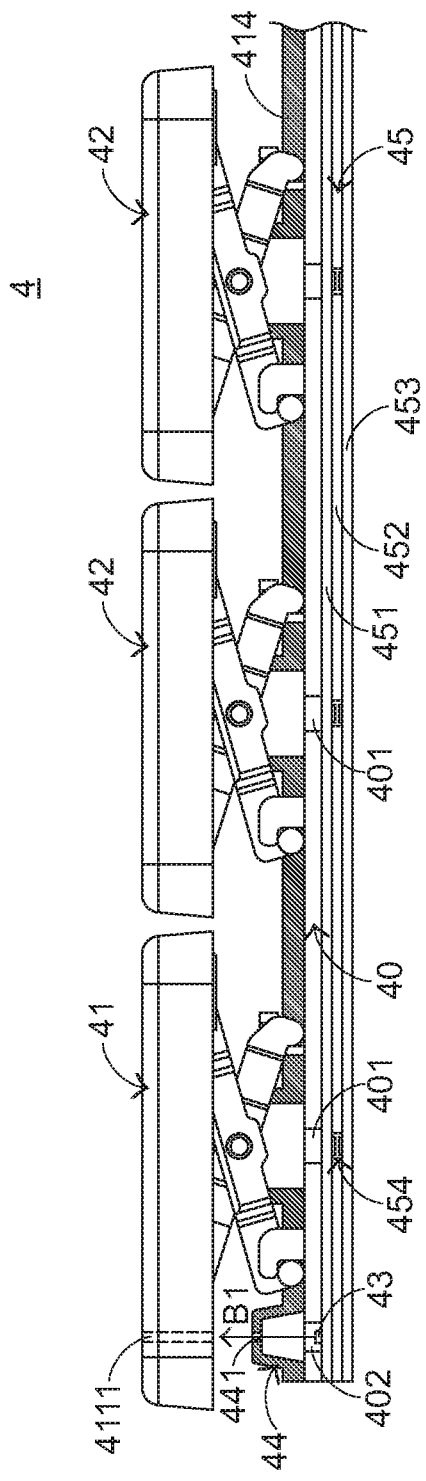
FIG. 5 is a schematic view illustrating a keyboard device with a luminous key according to a second embodiment of the present invention.

The present invention further provides a keyboard device of a second embodiment. FIG. 5 is a schematic view illustrating a keyboard device with a luminous key according to a second embodiment of the present invention. As shown in FIG. 5, the keyboard device 4 comprises a supporting plate 40, at least one luminous key 41, plural non-luminous keys 42, at least one top-view light-emitting element 43, a light shade 44, and a membrane switch circuit member 45. The supporting plate 40 is disposed over the membrane switch circuit member 45 for supporting the at least one luminous key 41 and the plural non-luminous keys 42. Except for the following three items, the structures of the keyboard device 4 of this embodiment are substantially identical to those of the keyboard device 3 of the first embodiment, and are not redundantly described herein.

Firstly, the at least one top-view light-emitting element 43 is disposed on an upper wiring board 451 of the membrane switch circuit member 45, and electrically connected with the trace pattern of the upper wiring board 451. For clarification and brevity, the trace pattern of the upper wiring board 451 is not shown in the drawings. Secondly, the supporting plate 40 is disposed over the membrane switch circuit member 45, so that the at least one luminous key 41 is disposed on the supporting plate 40. Moreover, the supporting plate 40 comprises at least one first aperture 401 and at least one second aperture 402. The at least one first aperture 401 is aligned with the at least one luminous key 41, and disposed under at least one elastic element 412 of the at least one luminous key 41. When the at least one keycap 411 of the at least one luminous key 41 is depressed, a part of the at least one elastic element 412 is penetrated through the at least one first aperture 401 to trigger at least one key intersection 454 of the membrane switch circuit member 45. The at least one second aperture 402 is aligned with the at least one top-view light-emitting element 43. In addition, the at least one second aperture 402 is disposed over the at least one top-view light-emitting element 43, and sheltered by the light shade 44. The at least one second aperture 402 is used for accommodating the at least one top-view light-emitting element 43. Consequently, the first light beam B1 from the at least one top-view light-emitting element 43 can be transmitted through the at least one second aperture 402 and a light-outputting part 441 of the light shade 44, and directed to a first light-outputting zone 4111 of the at least one keycap 411. Thirdly, the keyboard device 4 comprises plural elastic elements 412. In this embodiment, the plural elastic elements 412 are disposed on an elastic layer 414. Moreover especially, the plural elastic elements 412 are integrally formed with the elastic layer 414.

From the above discussions, after the above components are combined together, the keyboard device 4 with the luminous key 41 is produced. When the luminous key 41 is depressed, the key intersection 454 of the membrane switch circuit member 45 is triggered to generate a luminous key signal. At the same time, the top-view light-emitting element 43 is driven to emit the first light beam B1 in response to the luminous key signal. The first light beam B1 is directed to the first light-outputting zone 4111 of the keycap 411 in order to illuminate the keycap 411.

Figure 6:
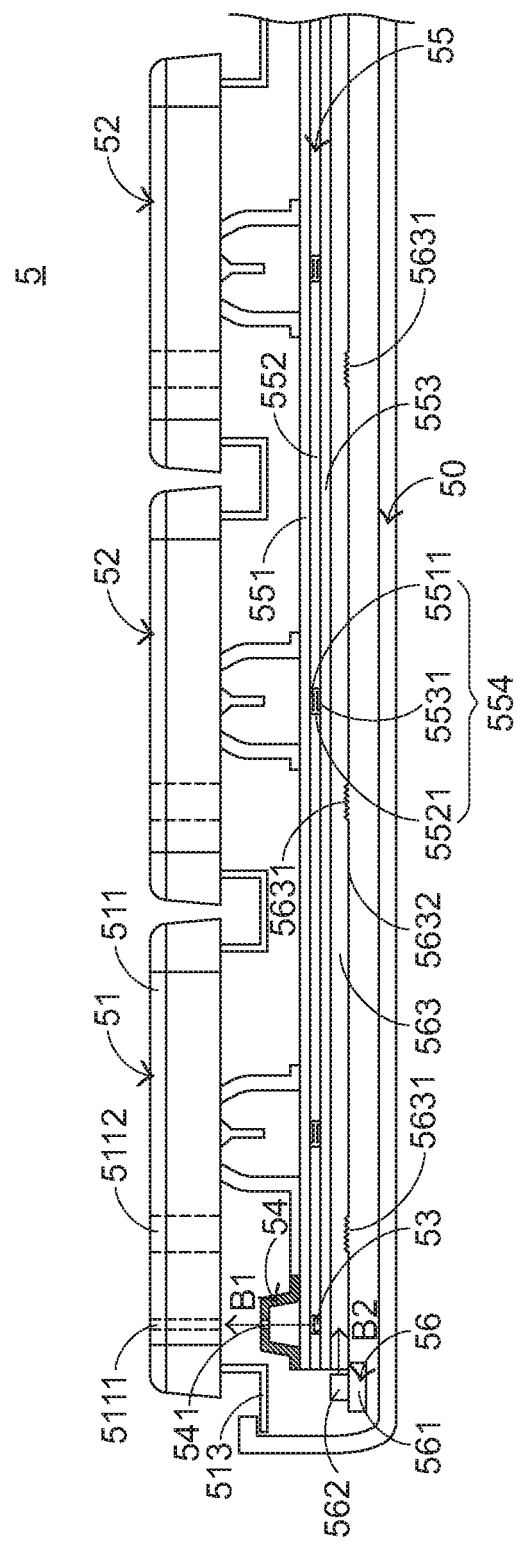
FIG. 6 is a schematic view illustrating a keyboard device with a luminous key according to a third embodiment of the present invention.

The present invention further provides a keyboard device of a third embodiment. FIG. 6 is a schematic view illustrating a keyboard device with a luminous key according to a third embodiment of the present invention. As shown in FIG. 6, the keyboard device 5 comprises a base 50, at least one first luminous key 51, plural second luminous keys 52, at least one top-view light-emitting element 53, a light shade 54, a membrane switch circuit member 55, and a backlight module 56. The base 50 is disposed under the membrane switch circuit member 55 for supporting the at least one first luminous key 51, the plural second luminous keys 52, the membrane switch circuit member 55 and the backlight module 56. Except for the following four items, the structures of the at least one top-view light-emitting element 53 and the membrane switch circuit member 55 of the keyboard device 5 and relationship between these components are substantially identical to those of the keyboard device 3 of the first embodiment, and are not redundantly described herein.

Figure 7:
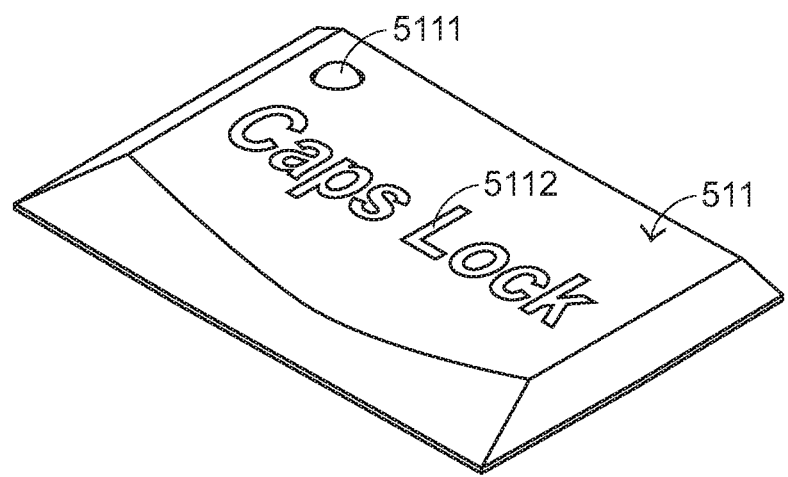
FIG. 7 is a schematic view illustrating a keycap of the luminous key of the keyboard device according to the third embodiment of the present invention.

Firstly, the at least one first luminous key 51 of the keyboard device 5 of this embodiment comprises at least one keycap 511, at least one elastic element 512, and at least one key housing 513. The at least one keycap 511 comprises a first light-outputting zone 5111 and at least one second light-outputting zone 5112. The at least one elastic element 512 is disposed under the at least one keycap 511. Moreover, the at least one elastic element 512 is contacted with the at least one keycap 511 for providing an elastic force to the at least one keycap 511. The at least one key housing 513 is arranged between the base 50 and the at least one keycap 511 for supporting the at least one keycap 511. In this embodiment, the first light-outputting zone 5111 is an indicating lamp cover, and the at least one second light-outputting zone 5112 is a laser-engraved light-transmissible zone with a laser-engraved character or a laser-engraved symbol. Examples of the first light-outputting zone 5111 and the second light-outputting zone 5112 are schematically shown in FIG. 7. Secondly, the keyboard device 5 of this embodiment further comprises the backlight module 56. The backlight module 56 is disposed under the at least one first luminous key 51 and the plural second luminous keys 52 for emitting at least one second light beam B2 and allowing the at least one second light beam B2 to be transmitted through the second light-outputting zone 5112 of the at least one keycap 511. In this embodiment, the backlight module 56 comprises a flexible circuit board 561, at least one side-view light-emitting element 562, and a light guide plate 563. The flexible circuit board 561 is connected with the membrane switch circuit member 55. The at least one side-view light-emitting element 562 is disposed on the flexible circuit board 561 for emitting the at least one second light beam B2. By acquiring electricity from the membrane switch circuit member 55, the flexible circuit board 561 is enabled to drive illumination of the at least one side-view light-emitting element 562. The light guide plate 563 is disposed under the membrane switch circuit member 55 for guiding the at least one second light beam B2 to the second light-outputting zone 5112. The light guide plate 563 has plural light-guiding structures 5631. The plural light-guiding structures 5631 are formed on a bottom surface 5632 of the light guide plate 563 for guiding the at least one second light beam B2 to the second light-outputting zone 5112. In this embodiment, the light-guiding structures 5631 are V-cut microstructures. Alternatively, in some other embodiments, the light-guiding structures are texturing structures, or the light-guiding structures are produced by forming a layer of light-guiding ink.

Thirdly, the light shade 54 of the keyboard device 5 of this embodiment is made of an opaque rubbery material, and the at least one elastic element 512 is made of a light-transmissible rubbery material. Moreover, the light shade 54 and the at least one elastic element 512 are produced by a double injection process. A light-outputting part 541 of the light shade 54 is a light-transmissible zone. Fourthly, each of the plural second luminous keys 52 has the second light-outputting zone 5112. The structure and the function of the second light-outputting zone 5112 of the second luminous key 52 are substantially identical to those of the second light-outputting zone 5112 of the first luminous key 51, and are not redundantly described herein.

From the above discussions, after the above components are combined together, the keyboard device 5 with the luminous key 51 is produced. When the luminous key 51 is depressed, the key intersection 554 of the membrane switch circuit member 55 is triggered to generate the luminous key signal. At the same time, the top-view light-emitting element 53 is driven to emit the at least one first light beam B1 in response to the luminous key signal. Since the at least one first light beam B1 is transmitted through the light-outputting part 541 of the light shade 54, the at least one first light beam B1 is centralized to be directed to the first light-outputting zone 5111 of the keycap 511 in order to illuminate the keycap 511. On the other hand, the at least one side-view light-emitting element 562 is used for emitting the at least one second light beam B2. The at least one second light beam B2 is guided to the second light-outputting zone 5112 of the keycap 511 by the light guide plate 563 in order to illuminate the laser-engraved character or the laser-engraved symbol of the second light-outputting zone 5112. Especially, due to the arrangement of the light shade 54, the first light beam B1 and the second light beam B2 are properly isolated from each other without being mixed.

Figure 8:
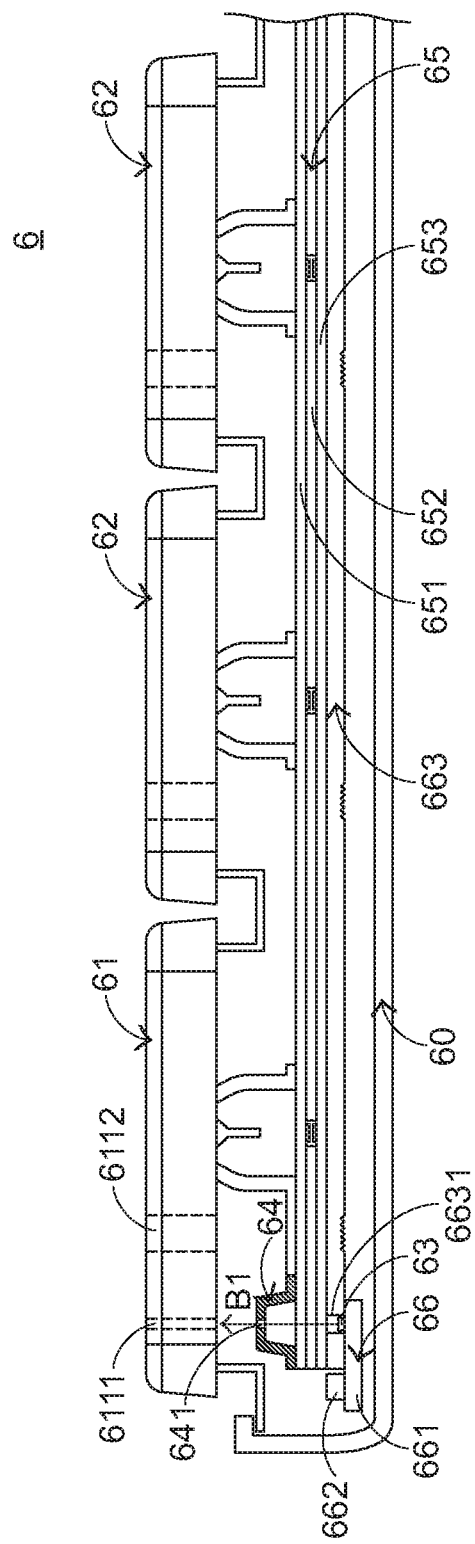
FIG. 8 is a schematic view illustrating a keyboard device with a luminous key according to a fourth embodiment of the present invention.

The present invention further provides a keyboard device of a fourth embodiment. FIG. 8 is a schematic view illustrating a keyboard device with a luminous key according to a fourth embodiment of the present invention. As shown in FIG. 8, the keyboard device 6 comprises a base 60, at least one first luminous key 61, plural second luminous keys 62, a top-view light-emitting element 63, a light shade 64, a membrane switch circuit member 65, and a backlight module 66. Except for the following items, the structures of the components of the keyboard device 6 and relationship between these components are substantially identical to those of the keyboard device 5 of the third embodiment, and are not redundantly described herein.

In comparison with the keyboard device 5, a light guide plate 663 of the backlight module 66 of the keyboard device 6 comprises a second perforation 6631. The second perforation 6631 is disposed under the light shade 64. The top-view light-emitting element 63 and at least one side-view light-emitting element 662 of the backlight module 66 are both disposed on a flexible circuit board 661 of the backlight module 66. Moreover, the top-view light-emitting element 63 is inserted into the second perforation 6631. Consequently, a first light beam B1 from the top-view light-emitting element 63 can be transmitted through the second perforation 6631, the membrane switch circuit member 65 and a light-outputting part 641 of the light shade 64, and directed to a first light-outputting zone 6111 of the first luminous key 61. In this embodiment, each of an upper wiring board 651, a partition plate 652 and a lower wiring board 653 of the membrane switch circuit member 65 is made of a light-transmissible material, so that the first light beam B1 is permitted to go through. An example of the light-transmissible material includes but is not limited to polyethylene terephthalate (PET), polycarbonate (PC) or polymethylmethacrylate (PMMA).

Figure 9:
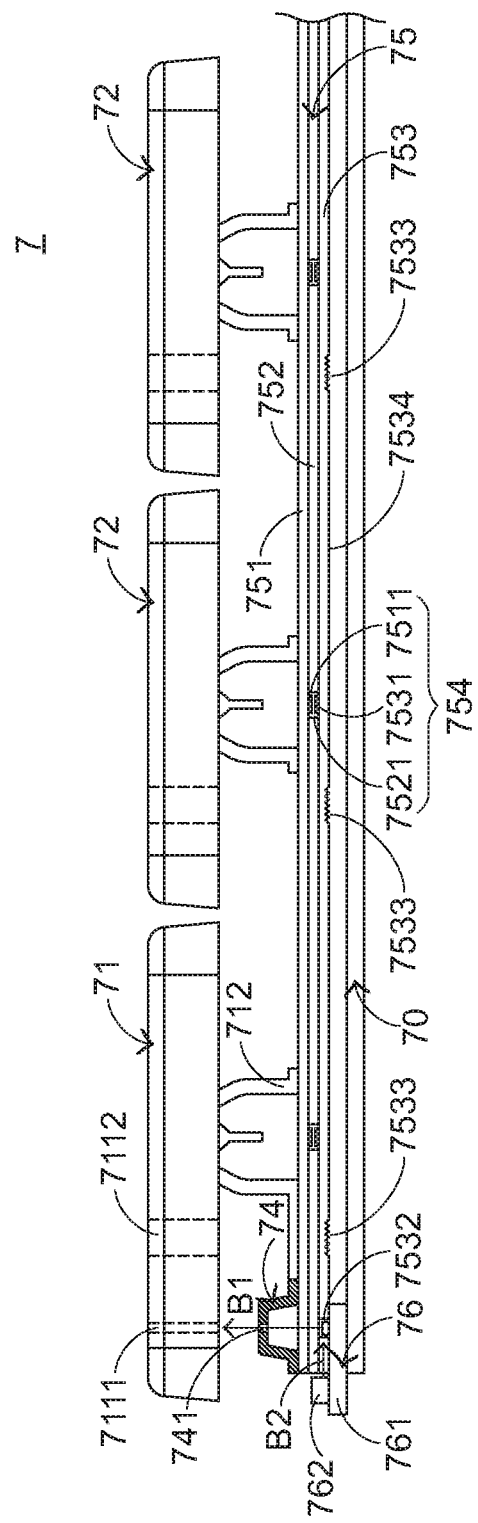
FIG. 9 is a schematic view illustrating a keyboard device with a luminous key according to a fifth embodiment of the present invention.

The present invention further provides a keyboard device of a fifth embodiment. FIG. 9 is a schematic view illustrating a keyboard device with a luminous key according to a fifth embodiment of the present invention. As shown in FIG. 9, the keyboard device 7 comprises a supporting plate 70, at least one first luminous key 71, plural second luminous keys 72, a top-view light-emitting element 73, a light shade 74, a membrane switch circuit member 75, and a backlight module 76. The supporting plate 70 is disposed under the membrane switch circuit member 75 and the backlight module 76 for supporting the at least one first luminous key 71, the plural second luminous keys 72, the membrane switch circuit member 75 and the backlight module 76.

Figure 10:
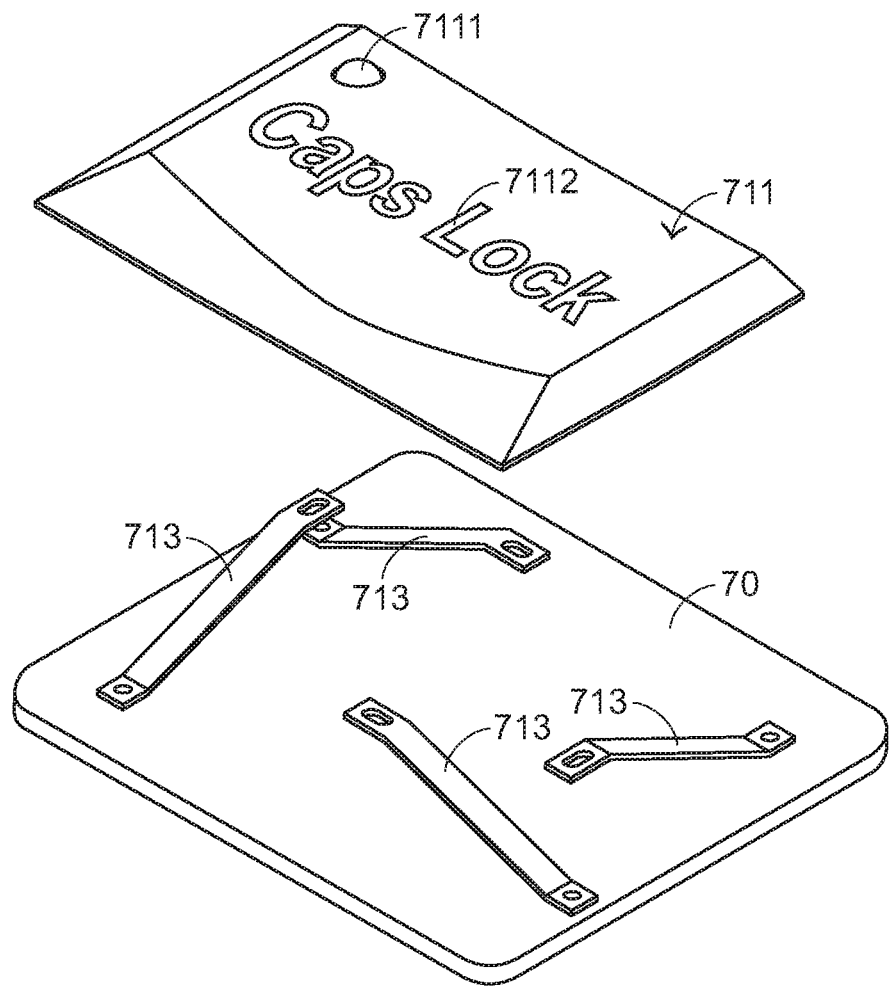
FIG. 10 is a schematic partial exploded view illustrating the keyboard device according to the fifth embodiment of the present invention.

FIG. 10 is a schematic partial exploded view illustrating the keyboard device according to the fifth embodiment of the present invention. Please refer to FIGS. 9 and 10. The at least one luminous key 71 comprises at least one keycap 711, at least one elastic element 712, and at least one connecting element 713. The at least one keycap 711 has a first light-outputting zone 7111 and a second light-outputting zone 7112. The at least one elastic element 712 is disposed under the at least one keycap 711. Moreover, the at least one elastic element 712 is contacted with the at least one keycap 711 for providing an elastic force to the at least one keycap 711. The at least one connecting element 713 is arranged between the supporting plate 70 and the at least one keycap 711. The at least one connecting element 713 is used for connecting the supporting plate 70 and the at least one keycap 711 and allowing the at least one keycap 711 to be moved upwardly and downwardly relative to the supporting plate 70. In this embodiment, the first light-outputting zone 7111 is an indicating lamp cover, the second light-outputting zone 7112 is a laser-engraved light-transmissible zone, and the connecting element 713 is an elastic arm.

The top-view light-emitting element 73 is disposed under the first light-outputting zone 7111 for emitting a first light beam B1. The first light beam B1 is transmitted through the first light-outputting zone 7111. The light shade 74 is connected with the at least one elastic element 712, and disposed over the top-view light-emitting element 73. The light shade 74 has a light-outputting part 741. The first light beam B1 is shaded by the light shade 74. However, the first light beam B1 can be transmitted through the light-outputting part 741, and directed to the first light-outputting zone 7111. In this embodiment, the light shade 74 and the at least one elastic element 712 are integrally formed with each other. Moreover, the light shade 74 and the at least one elastic element 712 are made of a light-transmissible rubbery material, wherein a paint-sprayed light-shading layer (not shown) is formed on a surface of the light-transmissible light shade 74 for shading the first light beam B1. The light-outputting part 741 of the light shade 74 is a light-transmissible zone which is not sheltered by the light-shading layer. The structures of the second luminous keys 72 are substantially identical to those of the third embodiment, and are not redundantly described herein.

The membrane switch circuit member 75 is disposed under the at least one elastic element 712. The membrane switch circuit member 75 has at least one key intersection 754 corresponding to the at least one luminous key 71. In this embodiment, the membrane switch circuit member 75 comprises an upper wiring board 751, a partition plate 752, and a lower wiring board 753. The upper wiring board 751 has at least one upper contact 7511. The partition plate 752 is disposed under the upper wiring board 751. In addition, the partition plate 752 has at least one first perforation 7521 corresponding to the at least one upper contact 7511. When the membrane switch circuit member 75 is depressed, the at least one upper contact 7511 is inserted into the at least one first perforation 7521. The lower wiring board 753 is disposed under the partition plate 752. In addition, the lower wiring board 753 has at least one lower contact 7531 corresponding to the at least one upper contact 7511. The at least one upper contact 7511, the at least one first perforation 7521 and the at least one lower contact 7531 are collectively defined as the at least one key intersection 754.

When the at least one keycap 711 is depressed by the user, the at least one connecting element 713 is correspondingly switched to a folded state. Consequently, the at least one keycap 711 is moved downwardly relative to the supporting plate 70, and the at least one elastic element 712 is depressed and compressed by the at least one keycap 711. Under this circumstance, since the at least one key intersection 754 is pushed by the at least one elastic element 712, the at least one key intersection 754 is triggered to generate a corresponding luminous key signal. On the other hand, when the depressing force exerted on the at least one keycap 711 is eliminated, an elastic force provided by the at least one elastic element 712 is acted on the at least one keycap 711. In response to the elastic force, the at least one keycap 711 is returned to an original position.

The backlight module 76 is disposed under the at least one first luminous key 71 for emitting at least one second light beam B2 and allowing the at least one second light beam B2 to be transmitted through the second light-outputting zone 7112 of the at least one keycap 711. In this embodiment, the backlight module 76 comprises a flexible circuit board 761 and at least one side-view light-emitting element 762. The flexible circuit board 761 is connected with the membrane switch circuit member 75. The at least one side-view light-emitting element 762 is disposed on the flexible circuit board 761 for emitting the at least one second light beam B2.

As shown in FIG. 9, the lower wiring board 753 further comprises a second perforation 7532 and plural light-guiding structures 7533. The second perforation 7532 is disposed under the light shade 74. The plural light-guiding structures 7533 are formed on a bottom surface 7534 of the lower wiring board 753. The top-view light-emitting element 73, which is disposed on the flexible circuit board 761, is inserted into the second perforation 7532. The upper wiring board 751 and the partition plate 752 are light-transmissible for allowing the first light beam B1 to go through. Consequently, the first light beam B1 from the top-view light-emitting element 73 can be transmitted through the second perforation 7532, the partition plate 752, the upper wiring board 751 and the light-outputting part 741, and directed to the first light-outputting zone 7111. Under this circumstance, the user can identify whether a specific function corresponding to the luminous key 71 is enabled by naked eyes according to the illuminating status of the first light-outputting zone 7111. In this embodiment, each of an upper wiring board 751, a partition plate 752 and a lower wiring board 753 is made of a light-transmissible material, so that the first light beam B1 is permitted to go through. An example of the light-transmissible material includes but is not limited to polyethylene terephthalate (PET), polycarbonate (PC) or polymethylmethacrylate (PMMA).

Moreover, the plural light-guiding structures 7533 on the lower wiring board 753 are used for guiding the at least one second light beam B2 to the second light-outputting zone 7112. In this embodiment, each of the light-guiding structures 7533 is a V-cut microstructure, a texturing structure, or a light-guiding ink layer. That is, in this embodiment, the lower wiring board 753 is also used as a light guide plate. By acquiring electricity from the membrane switch circuit member 75, the flexible circuit board 761 is enabled to drive illumination of the top-view light-emitting element 73 and the at least one side-view light-emitting element 762.

From the above discussions, after the above components are combined together, the keyboard device 7 with the luminous key 71 is produced. Moreover, since the lower wiring board 753 can be used to replace the light guide plate, it is not necessary to install the light guide plate on the keyboard device 7 of this embodiment. Consequently, the overall height of the keyboard device 7 is reduced, and the design of this embodiment is helpful to meet the requirement of the light weightiness and slimness.

Moreover, in the keyboard device of the third, fourth or fifth embodiment, the backlight module may be further equipped with a reflector. The reflector is disposed under the light guide plate or the lower wiring board which is used as the light guide plate to reflect the second light beam, thereby increasing the amount of the light beam that is directed to the second light-outputting zone.

From the above descriptions, the present invention provides a keyboard device with a luminous key. The elastic element and the light shade of the keyboard device are integrally formed with each other. Consequently, the contact area between the bottom surfaces of the elastic element and the light shade and the membrane switch circuit member or the supporting plate is increased. Under this circumstance, the possibility of detaching the light shade is minimized, and the illuminating efficacy of the luminous key is not impaired. Moreover, due to the arrangement of the light shade, the first light beam and the second light beam are properly isolated from each other without being mixed. Consequently, the illuminating efficacy of the luminous key is further enhanced. Moreover, since a part of the membrane switch circuit member of the keyboard device may be used to replace the light guide plate, the overall height and the overall volume of the keyboard device are both reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A keyboard device, comprising:
    at least one luminous key comprising at least one keycap and at least one elastic element, wherein each of said at least one keycap has a first light-outputting zone, wherein said at least one elastic element is disposed under said at least one keycap and contacted with said at least one keycap for providing an elastic force to said at least one keycap;
    at least one top-view light-emitting element disposed under said corresponding first light-outputting zone for emitting at least one first light beam, wherein said at least one first light beam is transmitted through said corresponding first light-outputting zone;
    at least one light shade connected with said at least one elastic element, and disposed over said at least one top-view light-emitting element, wherein each of said at least one light shade has a light-outputting part, wherein said at least one first light beam is shaded by said at least one light shade, but said at least one first light beam is permitted to be transmitted through said corresponding light-outputting part and directed to said corresponding first light-outputting zone, wherein said at least one light shade and said at least one elastic element are integrally formed with each other; and
    a membrane switch circuit member, which is disposed under said at least one elastic element, wherein said membrane switch circuit member has at least one key intersection corresponding to said at least one luminous key, wherein said membrane switch circuit member comprises:
        an upper wiring board having at least one upper contact;
        a partition plate disposed under said upper wiring board, and having at least one first perforation corresponding to said at least one upper contact, wherein when said membrane switch circuit member is depressed, said at least one upper contact is inserted into said at least one first perforation; and
        a lower wiring board disposed under said partition plate, and having at least one lower contact corresponding to said at least one upper contact, wherein said at least one upper contact, said at least one first perforation and said at least one lower contact are collectively defined as said at least one key intersection,
    wherein said partition plate further comprises at least one second perforation, wherein said at least one second perforation is disposed under said at least one light shade, and at least one top-view light-emitting element is disposed on said lower wiring board and inserted into said at least one second perforation, wherein said at least one first light beam from said at least one top-view light-emitting element is transmitted through said at least one second perforation, said upper wiring board and said corresponding light-outputting part and directed to said corresponding first light-outputting zone.

2. The keyboard device according to claim 1, wherein said at least one light shade is made of an opaque rubbery material, and said at least one elastic element is made of a light-transmissible rubbery material, wherein said at least one light shade and said at least one elastic element are produced by a double injection process.

3. The keyboard device according to claim 1, wherein said at least one light shade and said at least one elastic element are made of a light-transmissible rubbery material, wherein a paint-sprayed light-shading layer is formed on a surface of said at least one light shade for shading said at least one first light beam.

4. The keyboard device according to claim 1, wherein said light-outputting part is an opening or a light-transmissible zone.

5. The keyboard device according to claim 1, wherein said upper wiring board is made of a light-transmissible material, wherein said light-transmissible material is polyethylene terephthalate (PET), polycarbonate (PC) or polymethylmethacrylate (PMMA).

6. The keyboard device according to claim 1, further comprising a backlight module for emitting at least one second light beam and allowing said at least one second light beam to be transmitted through at least one second light-outputting zone of said at least one keycap, wherein said backlight module comprises:
- a flexible circuit board connected with said membrane switch circuit member; and
- at least one side-view light-emitting element disposed on said flexible circuit board for emitting said at least one second light beam.

7. The keyboard device according to claim 6, wherein said lower wiring board further comprises plural light-guiding structures, wherein said plural light-guiding structures are formed on a bottom surface of said lower wiring board for guiding said at least one second light beam to said at least one second light-outputting zone, wherein each of said light-guiding structures is a V-cut microstructure, a texturing structure or a light-guiding ink layer.

8. The keyboard device according to claim 6, wherein said backlight module further comprises a light guide plate, and said light guide plate is disposed under said membrane switch circuit member for guiding said at least one second light beam to said at least one second light-outputting zone, wherein said light guide plate comprises plural light-guiding structures, and said plural light-guiding structures are formed on a bottom surface of said light guide plate for guiding said at least one second light beam to said at least one second light-outputting zone, wherein each of said light-guiding structures is a V-cut microstructure, a texturing structure or a light-guiding ink layer.

9. The keyboard device according to claim 1, wherein said upper wiring board, said partition plate and said lower wiring board are all made of a light-transmissible material, wherein said light-transmissible material is polyethylene terephthalate (PET), polycarbonate (PC) or polymethylmethacrylate (PMMA).

10. The keyboard device according to claim 1, further comprising a supporting plate, which is disposed under said at least one luminous key for supporting said at least one luminous key, wherein said supporting plate comprises at least one aperture under said at least one elastic element, and a part of said at least one elastic element is allowed to be penetrated through said at least one aperture to trigger said membrane switch circuit member, wherein each of said at least one luminous key further comprises a connecting element between said supporting plate and said corresponding keycap for connecting said supporting plate and said corresponding keycap, and allowing said corresponding keycap to be moved upwardly and downwardly relative to said supporting plate, wherein when said at least one keycap is depressed, said at least one elastic element is compressed and said membrane switch circuit member is pushed by said at least one elastic element, so that said membrane switch circuit member is triggered to generate a luminous key signal, wherein when a depressing force exerted on said at least one keycap is eliminated, said at least one keycap is returned to an original position in response to said elastic force provided by said at least one elastic element.

11. The keyboard device according to claim 1, further comprising a supporting plate, which is disposed under said membrane switch circuit member for supporting said at least one luminous key and said membrane switch circuit module, wherein each of said at least one luminous key comprises a connecting element between said supporting plate and said corresponding keycap for connecting said supporting plate and said corresponding keycap, and allowing said corresponding keycap to be moved upwardly and downwardly relative to said supporting plate, wherein when said at least one keycap is depressed, said at least one elastic element is compressed and said membrane switch circuit module is pushed by said at least one elastic element, so that said membrane switch circuit member is triggered to generate a luminous key signal, wherein when a depressing force exerted on said at least one keycap is eliminated, said at least one keycap is returned to an original position in response to said elastic force provided by said at least one elastic element.

12. The keyboard device according to claim 1, further comprising a base for supporting said at least one luminous key, wherein said at least one luminous key further comprises at least one key housing between said base and said at least one keycap for supporting said at least one keycap, wherein when said at least one keycap is depressed, said at least one elastic element is compressed and said membrane switch circuit member is pushed by said at least one elastic element, so that said membrane switch circuit member is triggered to generate a luminous key signal, wherein when a depressing force exerted on said at least one keycap is eliminated, said at least one keycap is returned to an original position in response to said elastic force provided by said at least one elastic element.

13. A keyboard device, comprising:
- at least one luminous key comprising at least one keycap and at least one elastic element, wherein each of said at least one keycap has a first light-outputting zone, wherein said at least one elastic element is disposed under said at least one keycap and contacted with said at least one keycap for providing an elastic force to said at least one keycap;
- at least one top-view light-emitting element disposed under said corresponding first light-outputting zone for emitting at least one first light beam, wherein said at least one first light beam is transmitted through said corresponding first light-outputting zone;
- at least one light shade connected with said at least one elastic element, and disposed over said at least one top-view light-emitting element, wherein each of said at least one light shade has a light-outputting part, wherein said at least one first light beam is shaded by said at least one light shade, but said at least one first light beam is permitted to be transmitted through said corresponding light-outputting part and directed to said corresponding first light-outputting zone, wherein said at least one light shade and said at least one elastic element are integrally formed with each other;
- a membrane switch circuit member, which is disposed under said at least one elastic element, wherein said membrane switch circuit member has at least one key intersection corresponding to said at least one luminous key, wherein said membrane switch circuit member comprises:
  an upper wiring board having at least one upper contact;
  a partition plate disposed under said upper wiring board, and having at least one first perforation corresponding to said at least one upper contact, wherein when said membrane switch circuit member is depressed, said at least one upper contact is inserted into said at least one first perforation; and a lower wiring board disposed under said partition plate, and having at least one lower contact corresponding to said at least one upper contact, wherein said at least one upper contact, said at least one first perforation and said at least one lower contact are collectively defined as said at least one key intersection;

a backlight module for emitting at least one second light beam and allowing said at least one second light beam to be transmitted through at least one second light-outputting zone of said at least one keycap, wherein said backlight module comprises:
  a flexible circuit board connected with said membrane switch circuit member; and
  at least one side-view light-emitting element disposed on said flexible circuit board for emitting said at least one second light beam,
wherein said lower wiring board further comprises at least one second perforation, wherein said at least one second perforation is disposed under said at least one light shade, and at least one top-view light-emitting element is disposed on said flexible circuit board and inserted into said least one second perforation, wherein said least one first light beam from said at least one top-view light-emitting element is transmitted through said at least one second perforation, said partition plate, said upper wiring board and said corresponding light-outputting part and directed to said corresponding first light-outputting zone.

14. A keyboard device, comprising:
at least one luminous key comprising at least one keycap and at least one elastic element, wherein each of said at least one keycap has a first light-outputting zone, wherein said at least one elastic element is disposed under said at least one keycap and contacted with said at least one keycap for providing an elastic force to said at least one keycap;

at least one top-view light-emitting element disposed under said corresponding first light-outputting zone for emitting at least one first light beam, wherein said at least one first light beam is transmitted through said corresponding first light-outputting zone;

at least one light shade connected with said at least one elastic element, and disposed over said at least one top-view light-emitting element, wherein each of said at least one light shade has a light-outputting part, wherein said at least one first light beam is shaded by said at least one light shade, but said at least one first light beam is permitted to be transmitted through said corresponding light-outputting part and directed to said corresponding first light-outputting zone, wherein said at least one light shade and said at least one elastic element are integrally formed with each other; and a membrane switch circuit member, which is disposed under said at least one elastic element, wherein said membrane switch circuit member has at least one key intersection corresponding to said at least one luminous key, wherein said membrane switch circuit member comprises:
an upper wiring board having at least one upper contact;
a partition plate disposed under said upper wiring board, and having at least one first perforation corresponding to said at least one upper contact, wherein when said membrane switch circuit member is depressed, said at least one upper contact is inserted into said at least one first perforation; and
a lower wiring board disposed under said partition plate, and having at least one lower contact corresponding to said at least one upper contact, wherein said at least one upper contact, said at least one first perforation and said at least one lower contact are collectively defined as said at least one key intersection;

a backlight module for emitting at least one second light beam and allowing said at least one second light beam to be transmitted through at least one second light-outputting zone of said at least one keycap, wherein said backlight module comprises:
  a flexible circuit board connected with said membrane switch circuit member; and
  at least one side-view light-emitting element disposed on said flexible circuit board for emitting said at least one second light beam,
wherein said backlight module further comprises a light guide plate, and said light guide plate is disposed under said membrane switch circuit member for guiding said at least one second light beam to said at least one second light-outputting zone, wherein said light guide plate comprises plural light-guiding structures, and said plural light-guiding structures are formed on a bottom surface of said light guide plate for guiding said at least one second light beam to said at least one second light-outputting zone, wherein each of said light-guiding structures is a V-cut microstructure, a texturing structure or a light-guiding ink layer,
wherein said light guide plate further comprises at least one second perforation, wherein said at least one second perforation is disposed under said at least one light shade, and at least one top-view light-emitting element is disposed on said flexible circuit board and inserted into said least one second perforation, wherein said at least one first light beam from said at least one top-view light-emitting element is transmitted through said at least one second perforation, said lower wiring board, said partition plate, said upper wiring board and said corresponding light-outputting part and directed to said corresponding first light-outputting zone.

* * * * *